A. McCREIGHT & R. W. GLASGOW.
Cider and Wine Mills.
No. 136,847.           Patented March 18, 1873.
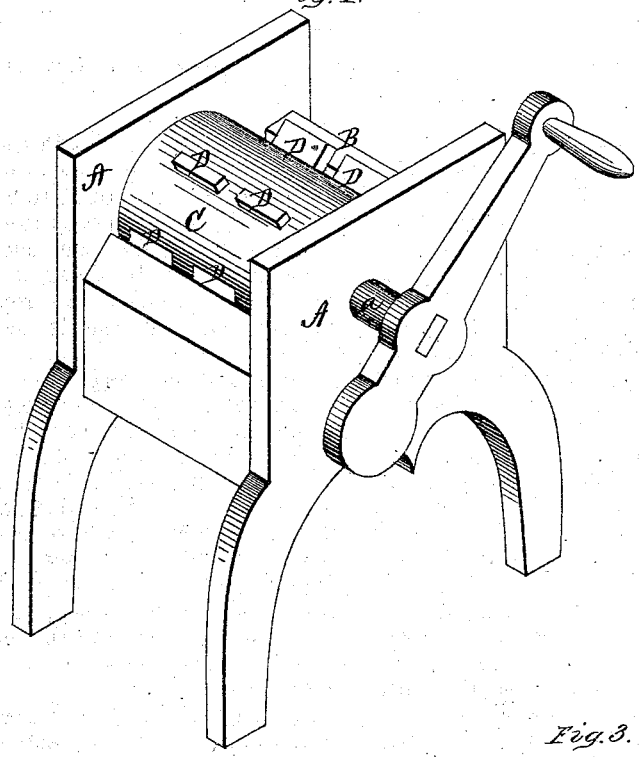
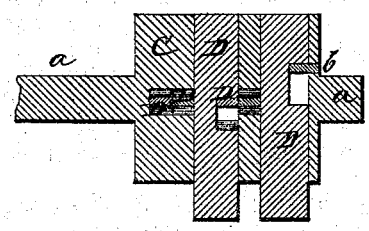
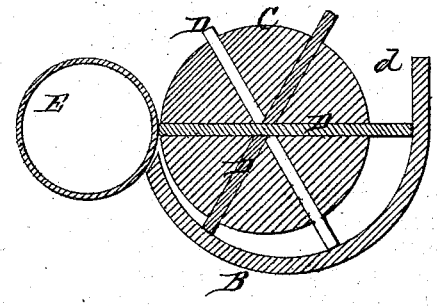

UNITED STATES PATENT OFFICE.

ALEXANDER McCREIGHT AND ROBERT W. GLASGOW, OF TRANQUILITY, OHIO.

IMPROVEMENT IN CIDER AND WINE MILLS.

Specification forming part of Letters Patent No. 136,847, dated March 18, 1873.

*To all whom it may concern:*

Be it known that we, ALEXANDER MC-CREIGHT and ROBERT W. GLASGOW, of Tranquility, in the county of Adams and State of Ohio, have invented certain new and useful Improvements in Cider and Wine Mills; and we do hereby declare that the following is a full, clear, and exact description thereof, reference being had to the accompanying drawing and to the letters of reference marked thereon, which form a part of this specification.

The nature of our invention consists in a revolving cylinder, provided with a series of movable interlocking bars passing through the cylinder at varying angles, and operating within a concave casing, as will be hereinafter more fully set forth.

In order to enable others skilled in the art to which our invention appertains to make and use the same, we will now proceed to describe its construction and operation, referring to the annexed drawing, in which—

Figure 1 is a perspective view of our machine; Fig. 2 is a longitudinal section of the cylinder; and Fig. 3 is a transverse section of the cylinder and concave.

A represents the frame of our machine, in which is a semicircular concave casing, B. C represents the cylinder, provided on its ends with journals $a$, which pass through the frame A at such points as to locate the cylinder close to one end of the concave B, but leave a space, $d$, at the other end. Through the cylinder C passes a series of bars, D D, at varying angles. These bars all pass through the longitudinal center of the cylinder, and are placed not only at varying angles, but at regular intervals from each other from one end of the cylinder to the other. The bars D D are movable endwise for a certain distance, and are cut out or notched as shown in Fig. 2, so as to interlock with each other, and prevent each other from moving except the desired distance. The first bar nearest one end of the cylinder is thus locked or rather limited in its movement by the second, the second by the third, and so on, until the last at the other end of the cylinder, which is locked by a key, $b$, inserted in said end of the cylinder. By removing said key the bars can all readily be removed when desired.

The operation is as follows: The fruit passes in at $a$, between the concave and cylinder, and is carried around by the bars D D. As the distance between the concave and the cylinder diminishes, the bars D D are pressed through the cylinder and the fruit crushed, extracting the juice, which passes over the edge of the concave while the pomace is carried over another cylinder, E, shown in Fig. 3; or a second cylinder may be used in connection with the concave by making the bars in the cylinder as wide as the cylinder is long, so as to fit the heading tight.

Having thus fully described our invention, what we claim as new, and desire to secure by Letters Patent, is—

1. The bars D, constructed so as each will interlock with another, and held in position by a single key, $b$, in the cylinder C, as and for the purpose set forth.

2. In a cider and wine mill, the combination of the interlocking arms D, cylinder C, and concave B, all constructed and arranged substantially as and for the purpose herein specified.

In testimony that we claim the foregoing as our own we affix our signatures in presence of two witnesses.

ALEXANDER McCREIGHT.
ROBERT W. GLASGOW.

Witnesses:
JOHN McCREIGHT,
G. H. VEIRS.